(12) United States Patent
Hurry et al.

(10) Patent No.: US 10,204,124 B1
(45) Date of Patent: Feb. 12, 2019

(54) DATABASE INDEXING AND PROCESSING

(71) Applicant: Merck Sharp & Dohme, Corp., Rahway, NJ (US)

(72) Inventors: David B. Hurry, Mount Airy, MD (US); David J. Tabacco, Phillipsburg, NJ (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 0 days.

(21) Appl. No.: 15/966,963

(22) Filed: Apr. 30, 2018

Related U.S. Application Data

(60) Provisional application No. 62/608,485, filed on Dec. 20, 2017.

(51) Int. Cl.
   *G06F 17/30* (2006.01)
(52) U.S. Cl.
   CPC .. *G06F 17/30342* (2013.01); *G06F 17/30551* (2013.01)
(58) Field of Classification Search
   CPC ............ G06F 17/30342; G06F 17/30551
   See application file for complete search history.

(56) References Cited

U.S. PATENT DOCUMENTS

| | | | |
|---|---|---|---|
| 8,902,248 B1* | 12/2014 | Bidarkar | G06F 17/246 345/619 |
| 9,553,838 B1* | 1/2017 | Panchenko | H04L 51/24 |
| 2003/0150908 A1* | 8/2003 | Pokorny | B23Q 35/12 235/375 |
| 2009/0125550 A1* | 5/2009 | Barga | G06F 9/542 |
| 2012/0063747 A1* | 3/2012 | Braun | G11B 27/034 386/280 |
| 2016/0098409 A1* | 4/2016 | Burke | G06F 3/0482 707/722 |
| 2017/0070659 A1* | 3/2017 | Kievsky | H04N 5/23206 |
| 2017/0083585 A1* | 3/2017 | Chen | G06F 11/30 |
| 2017/0091642 A1* | 3/2017 | Enck | G06N 7/005 |
| 2017/0213077 A1* | 7/2017 | Park | G06F 3/017 |

* cited by examiner

*Primary Examiner* — Kris E Mackes
*Assistant Examiner* — Tiffany Thuy Bui
(74) *Attorney, Agent, or Firm* — Fenwick & West LLP

(57) ABSTRACT

An indexing system indexes data entries in a database and processes queries of the database. The indexing system generates a key database storing keys that each represent a vector of a relative attribute between two data entries. For instance, a temporal distance indicates a relative time between timestamps of events represented by the two data entries. In other embodiments, relative attributes may be based on physical proximity, altitude, semantics, etc. The indexing system may also generate a key space database to enable efficient lookup of events associated with a target entity for indexing new data entries. For example, the indexing system may perform one read operation using the key space database to lookup all events associated with the target entity. Furthermore, the indexing system may determine responses for queries to retrieve events that occurred within a target temporal distance before or after a target type of event.

20 Claims, 17 Drawing Sheets

| Record | Subject | Event | Timestamp | DOB |
|---|---|---|---|---|
| 1 | SUBJECT_1 | DIAGNOSIS_A | 1/1/16 | 1972 |
| 2 | SUBJECT_1 | DIAGNOSIS_B | 1/23/16 | 1972 |
| 3 | SUBJECT_1 | TREATMENT_C | 2/3/16 | 1972 |
| 4 | SUBJECT_1 | PROCEDURE_D | 2/4/16 | 1972 |

| Vector | Relative Attribute | Source |
|---|---|---|
| A_B_SUBJECT_1 | +22 | Records 1,2 |
| A_C_SUBJECT_1 | +33 | Records 1,3 |
| A_D_SUBJECT_1 | +34 | Records 1,4 |
| B_A_SUBJECT_1 | -22 | Records 2,1 |
| B_C_SUBJECT_1 | +11 | Records 2,3 |
| B_D_SUBJECT_1 | +12 | Records 4,2 |
| C_A_SUBJECT_1 | -33 | Records 3,1 |
| C_B_SUBJECT_1 | -11 | Records 3,2 |
| C_D_SUBJECT_1 | +1 | Records 3,4 |
| D_A_SUBJECT_1 | -34 | Records 4,1 |
| D_B_SUBJECT_1 | -12 | Records 4,2 |
| D_C_SUBJECT_1 | -1 | Records 4,3 |

FIG. 3C

| Record | Subject | Event | Timestamp | DOB |
|---|---|---|---|---|
| 1 | SUBJECT_1 | DIAGNOSIS_A | 1/1/16 | 1972 |
| 2 | SUBJECT_1 | DIAGNOSIS_B | 1/23/16 | 1972 |
| 3 | SUBJECT_1 | TREATMENT_C | 2/3/16 | 1972 |
| 4 | SUBJECT_1 | PROCEDURE_D | 2/4/16 | 1972 |
| 5 | SUBJECT_2 | DIAGNOSIS_B | 3/3/16 | 1984 |
| 6 | SUBJECT_2 | TREATMENT_C | 3/6/16 | 1984 |

| Subject | Index | Value |
|---|---|---|
| SUBJECT_1 | Event | {A:"1/1/16"},{B:"1/23/16"},{C:"2/3/16"},{D:"2/4/16"} |
| SUBJECT_2 | Event | {B:"3/3/16"},{C:"3/6/16"} |

| Identifier | Relative Attribute | Source |
| --- | --- | --- |
| A_B_SUBJECT_1 | +22 | Records 1,2 |
| A_C_SUBJECT_1 | +33 | Records 1,3 |
| A_D_SUBJECT_1 | +34 | Records 1,4 |
| B_A_SUBJECT_1 | -22 | Records 2,1 |
| B_C_SUBJECT_1 | +11 | Records 2,3 |
| B_C_SUBJECT_2 | +3 | Records 5,6 |
| B_D_SUBJECT_1 | +12 | Records 4,2 |
| C_A_SUBJECT_1 | -33 | Records 3,1 |
| C_B_SUBJECT_1 | -11 | Records 3,2 |
| C_B_SUBJECT_2 | -3 | Records 6,5 |
| C_D_SUBJECT_1 | +1 | Records 3,4 |
| D_A_SUBJECT_1 | -34 | Records 4,1 |
| D_B_SUBJECT_1 | -12 | Records 4,2 |
| D_C_SUBJECT_1 | -1 | Records 4,3 |

| Identifier | Relative Attribute | Source |
|---|---|---|
| A_B_SUBJECT_1 | +22 | Records 1,2 |
| A_C_SUBJECT_1 | +33 | Records 1,3 |
| A_D_SUBJECT_1 | +34 | Records 1,4 |
| B_A_SUBJECT_1 | -22 | Records 2,1 |
| B_C_SUBJECT_1 | +11 | Records 2,3 |
| B_C_SUBJECT_2 | +3 | Records 5,6 |
| B_D_SUBJECT_1 | +12 | Records 4,2 |
| B_E_SUBJECT_2 | +100 | Records 5,7 |
| C_A_SUBJECT_1 | -33 | Records 3,1 |
| C_B_SUBJECT_1 | -11 | Records 3,2 |
| C_B_SUBJECT_2 | -3 | Records 6,5 |
| C_D_SUBJECT_1 | +1 | Records 3,4 |
| C_E_SUBJECT_2 | +97 | Records 6,7 |
| D_A_SUBJECT_1 | -34 | Records 4,1 |
| D_B_SUBJECT_1 | -12 | Records 4,2 |
| D_C_SUBJECT_1 | -1 | Records 4,3 |
| E_B_SUBJECT_2 | -100 | Records 7,5 |
| E_C_SUBJECT_2 | -97 | Records 7,6 |

Determine that a first timestamp of a first data entry is between a second timestamp of a second data entry and a third timestamp of a third data entry indexed in a database
502

Generate a first vector corresponding to a first temporal distance between the first data entry and the second data entry
504

Generate a second vector corresponding to a second temporal distance between the first data entry and the third data entry
506

Update the database to index the first data entry
508

Receive a query of the database from a client device
510

Determine a response to the query
512

Transmit the response to a client device
514

```
Determine a target index of a first data entry
522
```

```
Retrieve, from a key space database, a set of data entries
each associated with the target index
524
```

```
Determine that a first timestamp of the first data entry is
between a second timestamp of a second data entry and
a third timestamp of a third data entry
526
```

```
Generate a first key using a first temporal distance
between the first data entry and the second data entry
528
```

```
Generate a second key using a second temporal distance
between the first data entry and the third data entry
530
```

```
Update a key database to store the first key and the
second key
532
```

```
Update the key space database to index the first data
entry with the set of data entries
534
```

FIG. 5B

Choose an event

What is your center?

Heart Attack

Choose Filters
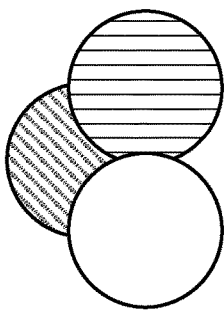
Gender
☑ Male
☑ Female
Show Treatments
ON
Date Range
Start / /
End / /
Geography?
Subject age range?
44-55
Exercise Rate
3-5 Times per week
FIG. 8B

DATABASE INDEXING AND PROCESSING

CROSS REFERENCE TO RELATED APPLICATIONS

This application claims the benefit of priority to U.S. Patent Application No. 62/608,485, filed Dec. 20, 2017, the content of which is incorporated herein by reference in its entirety.

TECHNICAL FIELD

The disclosure is related to the field of database indexing and processing.

BACKGROUND

Existing relational database tables store data in a structure of rows and columns. The database table is relational in that data entries within the same row (or column) are related to each other in at least one aspect, for example, associated with a given entity. Further, each row may have a key that is used for information lookup and retrieval from the database. However, these relational databases are limited in practical use by the combinatorial growth of data, complexity of determining and assessing the results of combinations of attributes of data, as well as performance demands and complexity of data processes at large scale. The technical challenges of indexing and retrieving data across sources are barriers to efficient data management operations and broader discovery of new research opportunities.

Since relational databases may store relational information on a per-entity basis, analysis of a sequence of events across one or more entities is difficult. For instance, a data user would need to construct complex queries with conditionals to retrieve information for one or more entities and combine the information for comparison. Thus, the structure of existing relational databases does not support analysis of relative time relationships between stored data entries. For example, relational databases do not support queries to lookup stored events that occurred within a given time interval relative to another event. Additionally, updating and querying relative time relationships may be combinatorially prohibitive at scale for relational databases. As a result, data users may overlook valuable information in the databases and their associated temporal patterns. It is desirable to maintain a database that continuously indexes its data entries to provide discovery of relative relationships across time or other dimensions.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example system environment for a database processing and management system (DPMS) in accordance with one embodiment.

FIG. 3A illustrates an example set of data entries of a database.

FIG. 3C illustrates an example key database for the data entries shown in FIG. 3A in accordance with one embodiment.

FIG. 4A illustrates another example set of data entries of a database.

FIG. 4B illustrates an example key space database for the data entries shown in FIG. 4A in accordance with one embodiment.

FIG. 4C illustrates an example key database for the data entries shown in FIG. 4A in accordance with one embodiment.

FIG. 4D illustrates indexing an example data entry using the key database shown in FIG. 4C in accordance with one embodiment.

FIG. 5A illustrates an example process flow for indexing and querying data entries in accordance with one embodiment.

FIG. 5B illustrates an example process flow for indexing data entries in accordance with one embodiment.

FIGS. 8A-D illustrate example user interface layouts for querying data entries in accordance with various embodiments.

Figure 1:
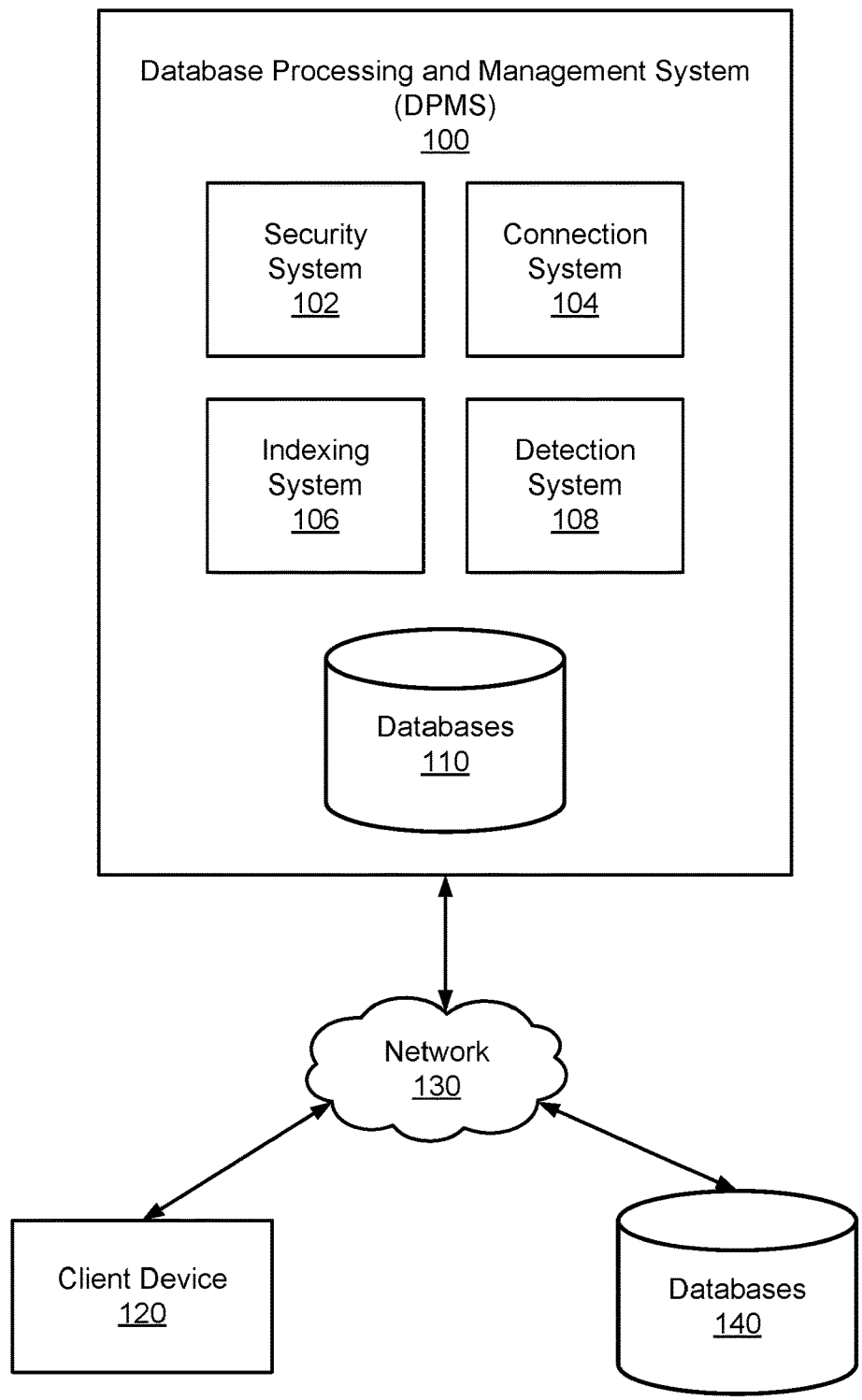

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an indexing system that indexes data entries in a database and processes queries of the database. Data entries may describe a type of event such as a symptom, diagnosis, treatment, or procedure for an entity. As described herein, an entity may represent an account for a subject, population of subjects (e.g., organized based on demographics or other data), other types of entities, or combinations thereof. For purposes of explanation, the embodiments described herein refer to a subject as the entity. For example, an account of the subject (e.g., electronic records stored in a database server) includes data describing events associated with the subject.

In some embodiments, the data entries have a timestamp, for example, a date and/or time, of the event. A key database stores keys that each represent each element or elements of a data entry or connection between data elements and entries of the database. In particular, a key may correspond to a vector of a relative attribute between two data entries in a certain dimension. For instance, a temporal distance represents relative time between the corresponding timestamps of events. In other embodiments, relative attributes may be based on absolute time, reference time (e.g., day of the week, hour of the day, etc.), physical proximity, altitude, semantics, etc. The database may be queried to determine events that occurred within a target temporal distance (e.g., relative or absolute time) before or after a target type of event. For example, the query may return events that occurred within 30 days of a certain type of disease diagnosis of one or more patients, which may help determine a potential correlation to symptoms of the disease. Additionally, the query may also indicate one or more criteria (filters or conditions), e.g., patients having the disease and located in a certain geographical area, or associated with certain demographic data.

Discovery and analysis of temporal trends or other relative attributes of data entries is especially relevant in medical and life science research due to the discrete nature of events such as symptoms, diagnoses, treatments, procedures, environment events, gene expressions, etc. Moreover, such research involves a constantly growing large-scale volume of sequences across subjects, populations, literature, experimental data, chemical and biological processes, among other sources and types of data. However, it should be noted that the embodiments described herein may be applicable to various other fields of use, database indexing or querying algorithms, data visualization applications, or database processing and management in general.

The disclosed embodiments of the indexing system provide a technical solution to a challenge unique to computing environments for database indexing and processing. Existing relational databases face technical issues in querying for relative attributes across one or more data entities. For example, the relational database enables querying of symptoms and diagnoses associated with a particular subject. However, to maintain a constant computational cost during indexing of data entries, the relational databases do not determine or store relative attributes between the symptoms and diagnoses across different subjects, e.g., especially as the number of events and entities grows continuously. Thus, the relational database does not facilitate exploration of such relative attributes. The technical solution disclosed herein addresses these and other issues by providing an indexing algorithm (e.g., a continuously indexing algorithm) that determines vectors representing relative attributes of combinations of data entries (e.g., events) and generates keys using the vectors. In addition, the technical solution may leverage the availability of computational resources of data centers or cloud computing to perform indexing as data entries are received for storage in a database (e.g., during ingest). Using the generated keys, the indexing system provides for querying and discovery of relative attributes in data at scale. The indexing system may use a key space database to enable quick lookup of indexes and relative attributes even at large scale. For example, the indexing system may perform one read operation of the key space database to retrieve all events associated with a certain user, regardless of the number of indexed events for the user.

System Overview

Figure (FIG. 1 illustrates an example system environment for a database processing and management system (DPMS) in accordance with one embodiment. The system environment shown in FIG. 1 includes the DPMS 100, client device 120, and one or more databases 140, which are connected to each other via a network 130. In other embodiments, different or additional entities can be included in the system environment. For example, though only one client device 120 and database 140 is shown in FIG. 1, the system environment may include additional client devices 120 and/or databases 140. The functions performed by the various entities of FIG. 1 may vary in different embodiments.

The DPMS 100 includes a security system 102, connection system 104, indexing system 106, detection system 108, and one or more databases 110. Alternative embodiments may include different or additional modules or omit one or more of the illustrated modules. The indexing system 106 indexes data entries for storage in databases and processes queries for data entries from the databases. The indexing system 106 is further described below with reference to FIGS. 2-5B.

Data entries may be stored in one or more of the databases 110 of the DPMS 100 or stored in other databases (e.g., databases 140) or systems outside of the DPMS 100. Data entries each represent discrete information and provide an atomic view of data stored in a given database. For purposes of explanation, the embodiments herein describe data entries that represent discrete events of a subject such as a medical symptom, diagnosis, treatment, procedure, environment events, gene expression, etc. In other embodiments, data entries may include various types of information including, for example, experimental data (e.g., molecular compounds, lab procedures, or scientific findings), intellectual property (e.g., patents or trade secrets), contracts (e.g., terms of use for licensed data), regulatory requirements (e.g., for scientific and financial filings with a government organization), sensitive information (e.g., patient information, health records, or human resources data), information technology controls (e.g., usernames, passwords, or other security credentials), among other types of information. A data entry may have any suitable format for representing discrete data, for example, an integer, decimal value, Boolean, string, character, timestamp, etc.

In some embodiments, the indexing system 106 may operate in conjunction with one or more other subsystems of the DPMS 100. The security system 102 determines and updates authorizations for users to perform various types of interactions with data entries of the DPMS 100. The connection system 104 determines connections between the data entries. In one use case, responsive to determining that multiple databases include related information (e.g., data from a hospital, a government agency, or a third party system), the connection system 104 may join or generate a union between data entries stored in the databases. The detection system 108 may classify the data entries. In some embodiments, the detection system 108 assumes that the data entries are self-expressive and determines the classifications based on contents of the data entries, e.g., rather than on labels of the data entries because the labels may vary between data sources from different systems.

Each client device 120 comprises one or more computing devices capable of processing data as well as transmitting and receiving data over a network 130. For example, a client device 120 may be a desktop computer, a laptop computer, a mobile phone, a tablet computing device, an Internet of Things (IoT) device, or any other device having computing and data communication capabilities. Each client device 120 includes a processor for manipulating and processing data, and a storage medium for storing data and program instructions associated with various applications. The storage medium may include both volatile memory (e.g., random access memory) and non-volatile storage memory such as hard disks, flash memory, and external memory storage devices.

The network 130 may comprise any combination of local area and wide area networks employing wired or wireless communication links. In one embodiment, network 130 uses standard communications technologies and protocols. For example, network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). In some embodiments, all or some of the communication links of the network 130 may be encrypted.

Example System Architecture

Figure 2:
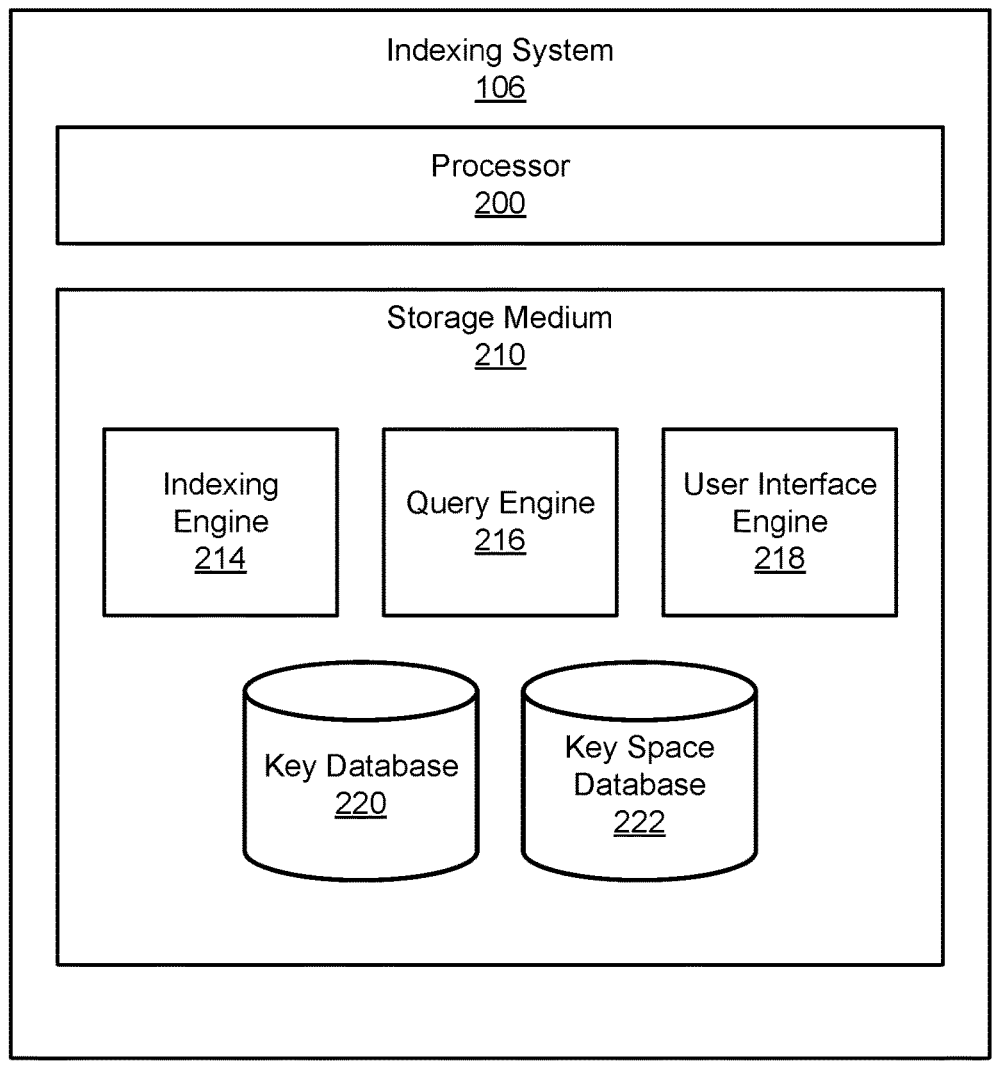
FIG. 2 illustrates an example block diagram of an indexing system in accordance with one embodiment.

FIG. 2 illustrates an example block diagram of the indexing system 106 in accordance with one embodiment. The indexing system 106 includes a processor 200 for manipulating and processing data, and a storage medium 210 for storing data and program instructions associated with various modules. In one example embodiment, the storage medium 210 comprises a non-transitory computer-readable storage medium. Various executable programs are each embodied as computer-executable instructions stored to the non-transitory computer-readable storage medium 210. The instructions when executed by the processor 200 cause the indexing system 106 to perform the functions attributed to the programs described herein. Further detail of an example computer system corresponding to the indexing system 106 is described below with reference to FIG. 6. The storage medium 210 includes an indexing engine 214, query engine 216, user interface engine 218, one or more key databases 220, and one or more key space databases 222. Alternative embodiments may include different or additional modules or omit one or more of the illustrated modules.

The indexing engine 214 indexes data entries of a database using a key database 220. The indexing engine 214 generates or updates the key database 220 for the database by determining one or more relative attributes between data entries stored in the database. A relative attribute may be based on time (e.g., between timestamps when events occurred), physical proximity (e.g., distance between geographical locations), altitude (e.g., height between positions), semantics (e.g., difference in meaning between words or symbols such as synonyms or antonyms), among other types of quantitative metrics or attributes.

The indexing engine 214 may generate a vector to represent a value and directionality of a relative attribute. For instance, the value represents a difference in time (also referred to herein as a "temporal distance") between two events and the directionality indicates which of the two events occurred before (or after) the other. In some embodiments, the indexing engine 214 generates a vector representing each connection (e.g., relative attribute) between the data entries of the database. Additionally, the indexing engine 214 generates a key for each vector for storage in a row of the key database 220. In some embodiments, for a given key representing a connection between two data entities, the corresponding row in the key database 220 may include the value and/or directionality of the relative attribute between the two data entities, an identifier (e.g., indicating the two data entities), and source (e.g., index) of the two data entities from the database.

In some embodiments, the indexing engine 214 generates a key space database 222 of the database by generating rows to represent each unique instance of an index from the database. For instance, the database includes information about events associated with different subjects. Thus, the indexing engine 214 generates a row for each of the subjects, where each row includes information describing the events of the corresponding subject. In comparison to the key database 220 that may include multiple rows per subject, the key space database 222 is a more compact representation of data because the key space database 222 may include only one row per subject in some embodiments. As a result, as the amount of data entries increases, the computational resources required by the indexing engine 214 to lookup events may remain constant, and the additional amount of data to be read associated with a subject grows linearly instead of exponentially. In some embodiments, the indexing engine 214 organizes the key space database 222 into blocks of events responsive to determining that the number of events per entity is greater than a threshold number. The organization into blocks may help ensure that the computational cost for lookup remains efficient for large datasets.

The query engine 216 processes queries for a database using the key database 220 of the database. The query may indicate a target relative attribute, for example, a duration of time, a physical distance, an altitude, a metric of similarity (or dissimilarity) in meaning between words, etc. The query may also indicate a target type of a data entry. For instance, types of events include a medical symptom, diagnosis, treatment, or procedure. Other types of data entries may describe characteristics of physical locations or words. The query engine 216 determines a response for the query by retrieving data from the database corresponding to a key that satisfies the query. For example, the query engine 216 determines whether the target type matches that of a data entry represented by a key. The query engine 216 may also compare the target relative attribute to the relative attributes represented by keys of the key database 220, e.g., to determine whether the target relative attribute is less than, equal to, and/or greater than a relative attribute of a given key.

The user interface engine 218 generates user interfaces for updating or interacting with databases using the indexing system 106. In particular, the user interface engine 218 may provide user interfaces for display via a client application executing on a client device 120 of a user (e.g., data owner or administrator). A user may input a query to the indexing system 106 and receive a response to the query using the user interfaces. In some embodiments, the user interface engine 218 provides "time machine" functionality. For example, the generated user interfaces display a timeline of events and enables a user to analyze events in both forward and backward chronological order. By exploring events that previously occurred (and/or current events or predicted events in the future), the user may discover relative attributes between events that may have been overlooked using other visualization methods. For example, a visual representation of the events as organized in a relational database structure may not reveal the relative attributes that are uncovered by the keys of the indexing engine 106. Example user interface layouts are illustrated in FIG. 7 and FIGS. 8A-D, which are further described below.

Example User Interface Layouts

Figure 7:
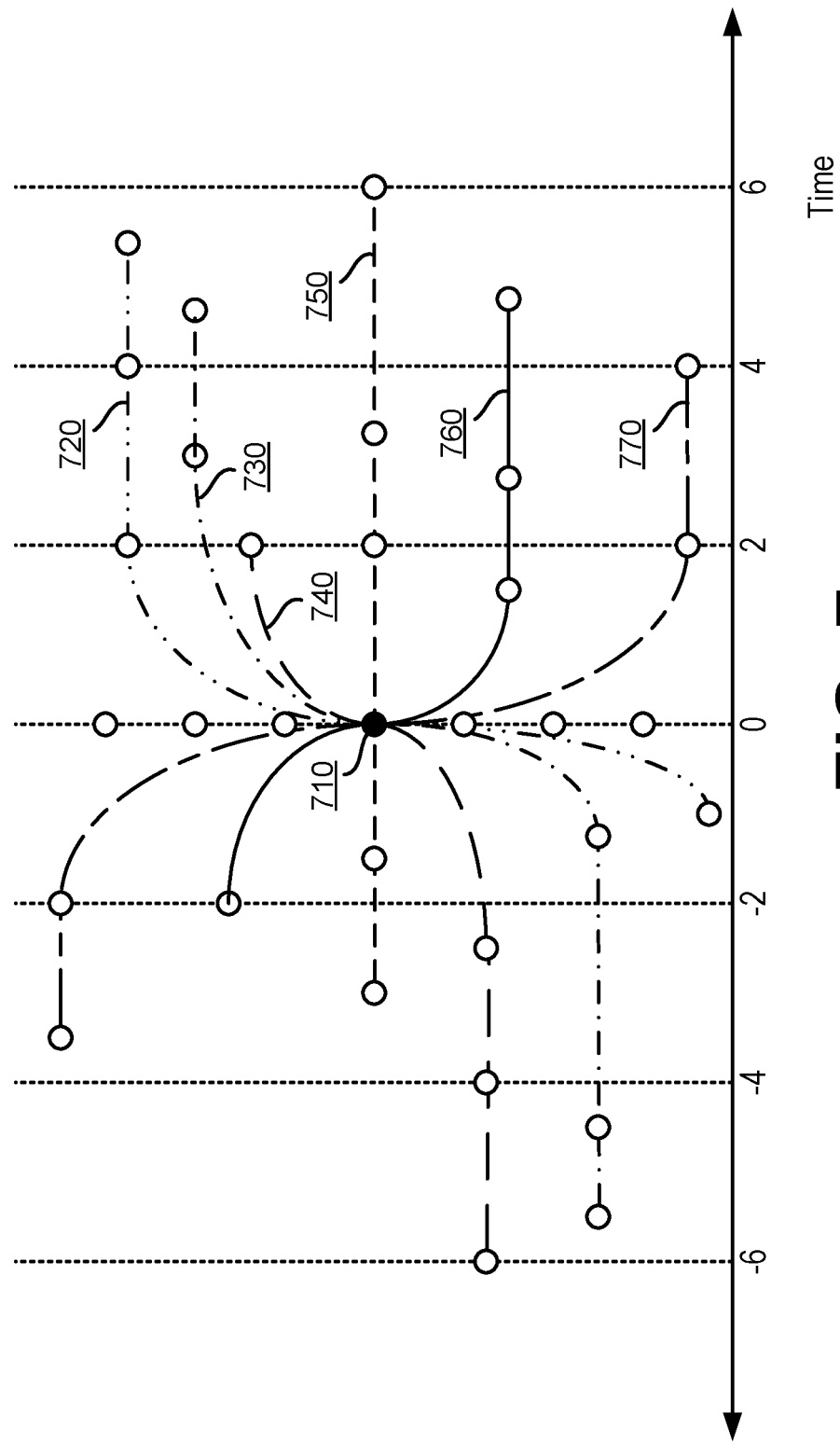
FIG. 7 illustrates an example user interface layout showing data entries in accordance with one embodiment.

FIG. 7 illustrates an example user interface layout showing data entries in accordance with one embodiment. The user interface shows an event of interest represented by the point 710 at a reference time (e.g., t=0). The event of interest is connected to other events indexed in a database, which is illustrated by the lines 720, 730, 740, 750, 760, and 770 representing vectors of relative attributes (e.g., events that occurred before, during, or after the event of interest). In some embodiments, the lines each represent events of a particular subject of an aggregate dataset. A line may connect any number of events, and events may occur at various points along the time line. The user interface engine 218 may organize the other events for presentation based on types of events, for example, diseases of the musculoskeletal system, skin and subcutaneous tissue, genitourinary system, digestive system, respiratory system, circulatory system, sense organs, nervous systems, blood, etc. The lines may also connect events associated with external causes of injury, poisoning, symptoms, signs, ill-defined conditions, mental disorders, endocrine, nutritional, or metabolic diseases, neoplasms, infections, or parasitic diseases, etc. The x-axis may represent a number of days or another measure of time from the event of interest (e.g., negative values indicating days preceding the event of interest).

FIGS. 8A-D illustrate example user interface layouts for querying data entries in accordance with various embodiments. A user may use a client device 120 to provide an input event of interest, as shown in the user interface in FIG. 8A. For instance, the user is interested in querying events that occurred relative to a heart attack event of a subject.

FIG. 8B illustrates example criteria (e.g., filters or conditions) for querying a database. In the embodiment shown in FIG. 8B, the user provides input indicating that the user is interested in subjects having an age range of 44-55 years, who exercise 3-5 times per week, and for both male and female genders. Other types of criteria include, for example, geography and date ranges (e.g., start and end date).

Figure 8A:
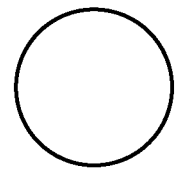
Figure 8C:
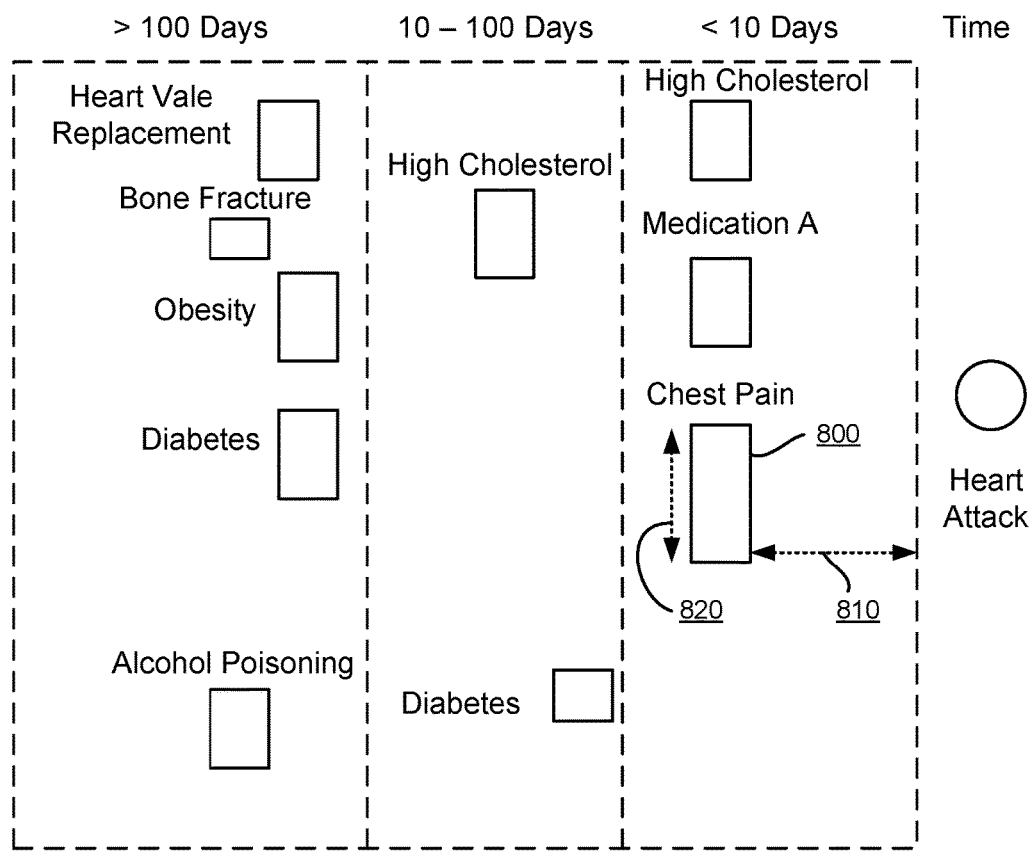

FIG. 8C illustrates example events that occurred before heart attack events of a group of one or more subjects. The indexing system 106 may retrieve (e.g., via the query engine 216) the events from a database responsive to a query input by a user, e.g., using the user interfaces shown in FIGS. 8A-B. The user interface in FIG. 8C may include the events organized into ranges of time along the x-axis, e.g., less than 10 days, 10-100 days, and greater than 100 days preceding the heart attack. In other embodiments, the ranges may vary or the events may not necessarily be organized into ranges of times. The graphic 800 represents aggregated chest pain events (e.g., symptoms) of the group of subjects that occurred within 10 days preceding the heart attack. The horizontal distance 810 represents the time between the heart attack and the median timestamp of the aggregated chest pain events. The height 820 of the graphic 800 represents the number of chest pain events relative to numbers of the other events. For instance, the height 820 is greater than the height of the graphic for bone fracture events, which indicates that the indexing system 106 retrieved a greater number of chest pain events than bone fracture events.

Figure 8D:
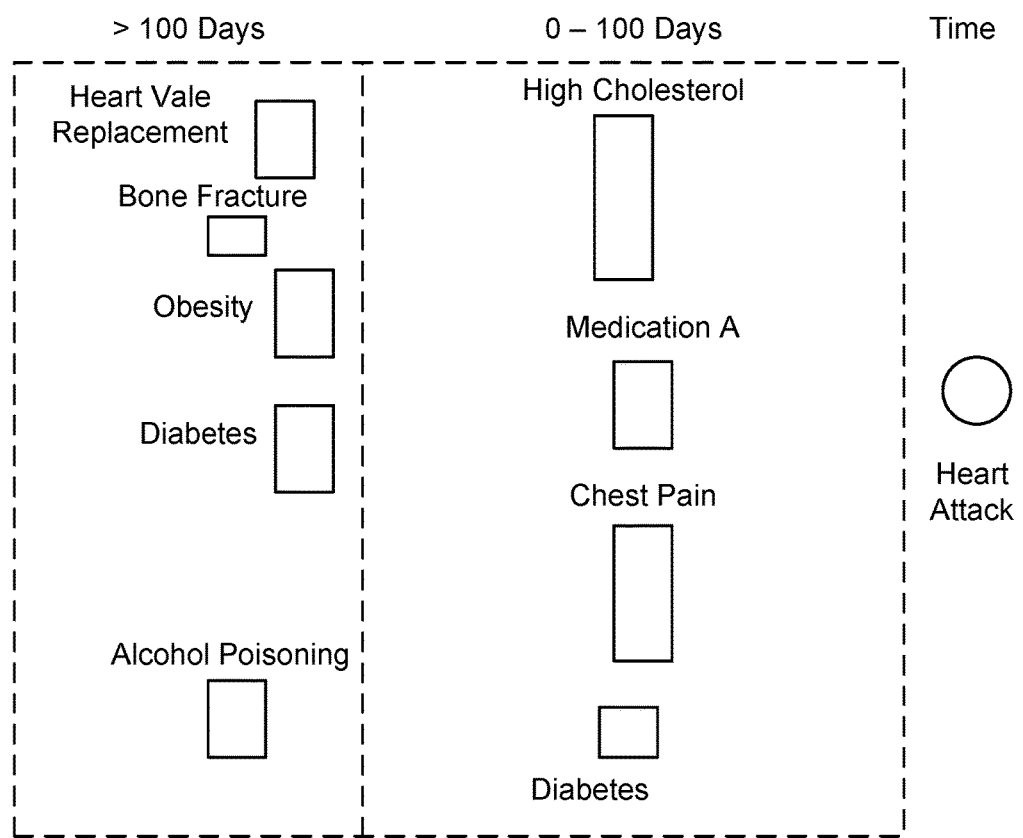

FIG. 8D illustrates a modified view of the user interface layout shown in FIG. 8C. Following in the example of FIG. 8C, the user interface engine 218 may receive input from a user to consolidate one or more of the time ranges. In the embodiment shown in FIG. 8D, the user interface includes a consolidated view of the events that occurred between 0-100 days preceding the heart attack. For instance, the user interface engine 218 combines the high cholesterol events shown in FIG. 8C for the "less than 10 days" and "10-100 days" ranges into one graphic illustrated in FIG. 8D. In an example use case, the user exploring a dataset for the group of subjects may use the user interfaces of FIGS. 8A-D to determine a potential correlation between diagnoses of high cholesterol and subsequent heart attack events.

Example Indexing of Data Entries

FIG. 3A illustrates an example set of data entries of a database. In the illustrated example, the set includes records of data entries stored in a relational database 300 where each row corresponds to an event for a subject. Furthermore, the columns include data entries indicating an identifier for a record, an identifier for a subject, an event, a timestamp of the event, and a date of birth (DOB) of a subject. Thus, the relational database 300 may be indexed by the identifier, event, timestamp, and DOB. Particularly, the example set includes four records each corresponding to a different event for a subject represented by subject account, "SUBJECT_1," having a DOB year of 1972. The events describe a "DIAGNOSIS_A," "DIAGNOSIS_B," "TREATMENT_C," and "PROCEDURE_D." Though the events are stored in the relational database 300 in chronological order according to the event date, in practice, records for events may be stored in a different order, randomly, or in any arbitrary order.

A client device 120 of a data user may retrieve information the relational database 300, for example, using a Structured Query Language (SQL) command such as "SELECT*FROM Events WHERE Subject=SUBJECT_1," where the "Events" is an identifier of the relational database 300. A response to the example SQL command includes the four data records because of the records is indexed under "SUBJECT_1." However, the relational database 300 does not allow the data user to query for relative attributes. For instance, the relational database 300 does not support a query to retrieve events that occurred during a month (e.g., 30 day time period) preceding "TREATMENT_C." The example shown in FIG. 3 includes only four records and is for illustration purposes only. Although, it may appear trivial to iterate through each record and check the timestamps to determine whether an event occurred during the preceding month with a small set of four records, the magnitude of the challenge grows significantly in conventional databases with much larger volume of records. In fact in practice, databases may include significantly larger numbers of records, and thus the runtime complexity to perform such a query may grow exponentially due to the required number of iterations through combinations of events.

Figure 3B:
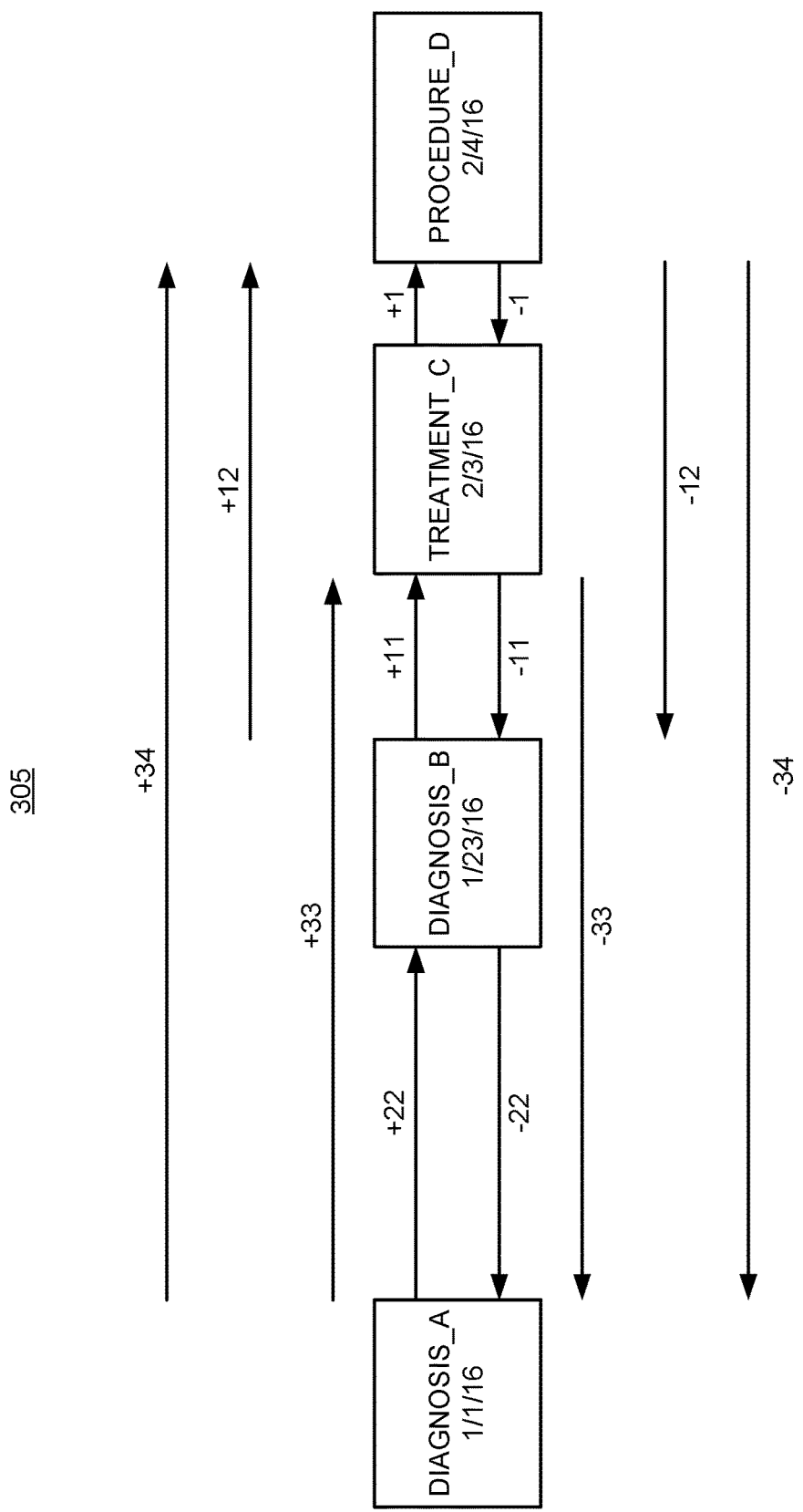
FIG. 3B illustrates example temporal distances of the data entries shown in FIG. 3A in accordance with one embodiment.

FIG. 3B illustrates example temporal attributes of the data entries shown in FIG. 3A in accordance with one embodiment. The example diagram 305 shown in FIG. 3B displays representations of the events stored the relational database 300 in FIG. 3A in chronological order (from left to right). Additionally, the diagram 305 includes vectors representing the relative temporal distance (e.g., relative time in number of days) between combinations of two events. For instance, based on the timestamps of the events stored in the relational database 300, the indexing engine 214 determines that "DIAGNOSIS_A" occurred on 1/1/16 and "DIAGNOSIS_B" occurred on 1/23/16. Thus, the indexing engine 214 determines that the relative temporal distance from "DIAGNOSIS_A" to "DIAGNOSIS_B" is +22 days. Note that the vectors in FIG. 3B are not illustrated necessarily to scale. In some embodiments, the indexing engine 214 excludes self-referential relationships, e.g., a relative temporal distance of an event to itself.

The indexing engine 214 may determine relative temporal distances that are directional. In some embodiments, the indexing engine 214 determines relative temporal distances that have positive values for vectors that are directed in chronological order and negative values for vectors that are directed in reverse chronological order. For instance, the relative temporal distance from "DIAGNOSIS_B" to "DIAGNOSIS_A" is −22 days, which is the inverse of the relative temporal distance from "DIAGNOSIS_A" to "DIAGNOSIS_B."

FIG. 3C illustrates an example key database 350 for the data entries shown in FIG. 3A in accordance with one embodiment. The key database 350 is an embodiment of the key database 220 of the indexing system 106 shown in FIG. 2. The key database 350 includes keys represented as rows storing information of the vectors shown in FIG. 3B. In contrast to the relational database 300 of FIG. 3A, the key database 350 is indexed by a vector identifier, temporal attribute, and source of data records.

In an embodiment, the indexing engine 214 generates vector identifiers indicating multiple points of a vector, as well as the identifier of a corresponding subject. For example, the vector identifier "A_B_SUBJECT_1" represents the vector from "DIAGNOSIS_A" to "DIAGNOSIS_B," which is associated with "SUBJECT 1." The temporal attribute of "A_B_SUBJECT_1" is the corresponding relative temporal distance of +22 (e.g., days in chronological order). The source of "A_B_SUBJECT_1" is record 1 and record 2 of the relational database 300. Thus, the indexing system 106 may trace keys back to the source data. The indexing engine 214 may generate the key database 350 upon ingest of information from the relational database 300, and may also update the key database 350 over time to reflect changes in the relational database. In some embodiments, the number of keys in the key database 350 grows exponentially as the number of events increases, e.g., the number of keys equals n·(n−1), where n is the number of events.

The query engine 216 may use the key database 350 to retrieve information from the relational database 300 based on relative attributes. In an embodiment, the query engine 216 processes a query to retrieve events that occurred within a time period preceding a "TREATMENT_C" type of event for subjects that had that type of event. The query is associated with a target vector including a target relative attribute, e.g., indicating that the time period is −30 days (e.g., negative value for preceding a target event). In response to the query, the query engine 216 filters keys of the key database 350 to determine a subset of keys having a vector identifier starting with "C," for example, "C_A_SUBJECT_1," "C_B_SUBJECT_1," and "C_D_SUBJECT_1." The query engine 216 retrieves the relative temporal distances of the subset of keys for comparison with the target relative attribute. In this example, by comparing −33 days, −11 days, and +1 days with the time period of −30 days, the query engine 216 determines that vector "C_B_SUBJECT_1" satisfies the criteria of the query, that is, "DIAGNOSIS_B" occurred within the 30 days preceding "TREATMENT_C" for "SUBJECT 1." The query engine 216 determines that records 2 and 3 of relational database 300 are the source of the key of "C_B_SUBJECT_1." Thus, the query engine 216 may retrieve information from records 2 and 3 of relational database 300 to determine a response to the query.

In an example use case, a user is researching factors that may potentially contribute to diagnoses of diabetes of adult subjects. To test a hypothesis or perform AB tests, the user uses the indexing engine 106 to query a database for certain events that the subjects experienced. The user may query for events that the subjects experienced during childhood that proceeded or preceded another event. For instance, a query may lookup symptoms that occurred after a subject consumed a particular type of food or medicine. As another example, a query may lookup activities that occurred before a symptom, e.g., physical activity that occurred before a subject experienced a headache or light-headedness.

In some embodiments, the query engine 216 filters information from databases using a baseline. The baseline may indicate certain known relationships (e.g., correlations or causations) between different events. For instance, a particular drug is known to have certain effects, or regular cardiovascular activity and exercise may lead to reduced blood pressure in the long term. Thus, by filtering information using the baseline, the query engine 216 can determine responses that may be more focused on undiscovered properties of the data stored in the database. Moreover, the query engine 216 may improve the signal-to-noise ratio of query results by filtering out predetermined sources of noise, artifacts, sampling biases, or other types of irrelevant or unreliable data.

FIG. 4A illustrates another example set of data entries of a database. In the illustrated example, the set includes records of data entries stored in a relational database 400 where each row corresponds to an event for a subject. The relational database 400 is indexed by the identifier of a subject account of a subject, event, timestamp, and DOB of the subject. The example set shown in FIG. 4A includes the four records of "SUBJECT_1" from relational database 300, in addition to two records of "DIAGNOSIS_B" and "TREATMENT_C" for another account of different subject, "SUBJECT_2."

FIG. 4B illustrates an example key space database 410 for the data entries shown in FIG. 4A in accordance with one embodiment. The key space database 410 is an embodiment of the key space database 222 of the indexing system 106 shown in FIG. 2. In the embodiment shown in FIG. 4B, the indexing engine 214 generates the key space database 410 to include a row for each subject identifier of the relational database 400. For each row, the indexing engine 214 may generate a consolidated representation of other data entries of the relational database 400 related to a corresponding index of the row. For example, the key space database 410 is indexed to consolidate the event index. In particular, the value column includes a data structure representing all (or at least some) of the events associated with a given subject, which is a more compact representation in comparison to the relational database 400 that includes a separate row for each event. In some embodiments, the data structure may be stored in a key or span several keys or values (e.g., for larger datasets having greater than a threshold number of events). To determine all of the events of a subject using the relational database 400, the indexing system 106 would need to iterate through each row of the relational database 400. In some embodiments, using the key space database 410, the indexing system 106 may perform a single scan and read operation to look up a target subject identifier and retrieve the data structure representing all of the events related to the subject. The compact representation of the data structure and key space database 410 provides this improvement in computational efficiency, which may be independent to the number of indexed events of the subject. In contrast, existing relational databases may not be scalable for large datasets of indexed events. In some embodiments, the data structure has a JavaScript Object Notation (JSON) format.

FIG. 4C illustrates an example key database 420 for the data entries shown in FIG. 4A in accordance with one embodiment. The key database 420 includes rows representing vectors between events stored in the relational database 400. In contrast to the key database 350 shown in FIG. 3C, the key database 420 of FIG. 4B includes keys for multiple subject accounts, "SUBJECT_1" and "SUBJECT_2."

FIG. 4D illustrates indexing an example data entry using the key database 420 shown in FIG. 4C in accordance with one embodiment. In one use case, the example data entry is an additional record to be included in the relational database 400. The additional record has a record identifier of "7," a subject identifier of "SUBJECT_2," an event of "DIAGNOSIS_E," a timestamp of "6/11/16," and a DOB of the subject of "1972" (as shown in FIG. 4A). To index the additional record, the indexing engine 214 determines a subset of events using the key space database 410. In some embodiments, the indexing engine 214 performs a scan operation to lookup a value (if any) corresponding to an index of a record to be indexed. In the above example, responsive to scanning the key space database 410 for events associated with the subject identifier "SUBJECT 2," the indexing engine 214 retrieves the value "{B:"3/3/16"},{C: "3/6/16"}," which describes the "DIAGNOSIS_B" event with timestamp 3/3/16 and "TREATMENT_C" event with timestamp 3/6/16.

The indexing engine 214 uses the subset of events to generate new keys representing vectors of combinations between the event of the additional record and events of the subset for "SUBJECT_2." In this example, the indexing engine 214 determines vector identifiers "B_E_SUBJECT_2," "C_E_SUBJECT 2," "E_B_SUBJECT 2," and "E_C_SUBJECT 2" for new keys to be included in the key database 420. The indexing engine 214 determines relative temporal distances for the new keys using the relative temporal distances of the subset of keys. According to the fifth record of relational database 400, the timestamp of "DIAGNOSIS_B" for "SUBJECT_2" is 3/3/16. The indexing engine 214 determines a difference of 100 days between 3/3/16 and the timestamp of the new "DIAGNOSIS_E" event, 6/11/16. Thus, the indexing engine 214 generates a new key having vector identifiers "B_E_SUBJECT_2" and a relative temporal distance of +100, e.g., the relative attribute for indexing in key database 420. The new key has a source of record 5 and record 7. The indexing engine 214 generates new keys for "C_E_SUBJECT_2," "E_B_SUBJECT_2," and "E_C_SUBJECT_2" in a similar manner.

As the number of events and keys stored in the databases increases, the number of combinations between each event may grow exponentially. Thus, it may be cost-prohibitive, or even impractical, for relational database systems to index additional data records by determining relative attributes for each combination. In contrast, the key space database 410 and key database 420 enable the indexing engine 214 to perform more efficient indexing relative to the relational databases. In particular, the run time complexity required to lookup the key space database 410 for events associated with a given index may remain constant, and the additional amount of data to be read may grow linearly instead of exponentially.

Example Process Flows

FIG. 5A illustrates an example process flow 500 for indexing and querying data entries in accordance with one embodiment. The indexing engine 214 of the indexing system 106 determines 502 that a first timestamp of a first data entry is between a second timestamp of a second data entry and a third timestamp of a third data entry. The second and third data entries are indexed in a database (e.g., relational database 300 or 400 shown in FIGS. 3A and 4B, respectively). The indexing engine 214 generates 504 a first vector corresponding to a first temporal distance between the first data entry and the second data entry using the first timestamp and the second timestamp. For example, the temporal distance represents the relative time between the first and second timestamps. The indexing engine 214 generates 506 a second vector corresponding to a second temporal distance between the first data entry and the third data entry using the first timestamp and the third timestamp. The indexing engine 214 updates 508 the database to index the first data entry using the first vector and the second vector.

The indexing system 106 receives 510 a query of the database from a client device 120. The query indicates at least a target temporal distance, e.g., a target duration of time. The query engine 216 determines 512 a response to the query by comparing the target temporal distance with at least one of the first temporal distance and the second temporal distance. In some embodiments, the comparison includes determining that at least one of the first temporal distance and the second temporal distance is less than or equal to the target temporal distance. In some embodiments, the query engine 216 determines the response by retrieving at least one key associated with one of the data entries from a key database (e.g., key database 350 or 420 shown in FIGS. 3C and 4C, respectively), where the retrieved key(s) indicates the first temporal distance and/or the second temporal distance. The query engine 216 may aggregate additional information for the response by repeating the comparison with any number of combinations of data entries and corresponding temporal distances.

The query engine 216 transmits 514 the response from the indexing system 106 to the client device 120. The response to the query may include information retrieved from the database using at least one of the keys of the key database, where the information is associated with at least one of the data entries that satisfy a criteria or condition of the query.

In some embodiments, the first data entry, second data entry, and third data entry describe a first event, second event, and third event, respectively. Each event occurred (or may occur) at the timestamp of the corresponding data entry. Responsive to the comparison in step 512, the query engine 216 may determine that at least one of the second event and the third event occurred within the target duration of time (e.g., target temporal distance) from the first event. In some embodiments, the query may also indicate a target type of event, and the query engine 216 determines that the target type of event corresponds to a type of the first event.

FIG. 5B illustrates an example process flow 520 for indexing data entries in accordance with one embodiment. The indexing engine 214 of the indexing system 106 determines 522 a target index of a first data entry. For instance, the target index indicates a subject or subject account. The indexing engine 214 retrieves 524 a set of data entries each associated with the target index from a key space database (e.g., key space database 410 shown in FIG. 4B). The set of data entries may be retrieved from a data structure stored in a row of the key space database corresponding to the target index, where the data structure includes information about events of the subject or subject account. In some embodiments, the key space database includes, for each of multiple entities, a data structure indicating all events stored in a particular database that are associated with the corresponding entity. Furthermore, the target index may indicate one of the multiple entities (e.g., a target subject or subject account).

In some embodiments, the indexing engine 214 indexes the first data entry into a database by repeating steps 526 through 534 of the process flow 520 for at least one pair of data entries of the set of data entries. Each of the pairs includes a second data entry and third data entry. The second and third data entries are existing entries indexed in the database.

The indexing engine 214 determines 526 that a first timestamp of the first data entry is between a second timestamp of the second data entry and a third timestamp of the third data entry. The indexing engine 214 generates 528 a first key using a first temporal distance (e.g., relative time) between the first data entry and the second data entry determined using the first timestamp and the second timestamp. The first key may map the first data entry to the second data entry. The indexing engine 214 generates 530 a second key using a second temporal distance between the first data entry and the third data entry determined using the first timestamp and the third timestamp. The second key may map the first data entry to the third data entry.

The indexing engine 214 updates 532 a key database (e.g., key database 350 or 420 shown in FIGS. 3C and 4C, respectively) to store the first key and the second key. For example, the indexing engine 214 adds additional rows to the key database to include the first and second keys, along with related information such as the corresponding temporal distances and sources of the data entries. The indexing engine 214 updates 534 the key space database to index the first data entry with the set of data entries. For example, the indexing engine 214 stores information describing an event of the first data entry in a data structure (e.g., JSON) of a value of the key space database corresponding to the target index.

Physical Components

Figure 6:
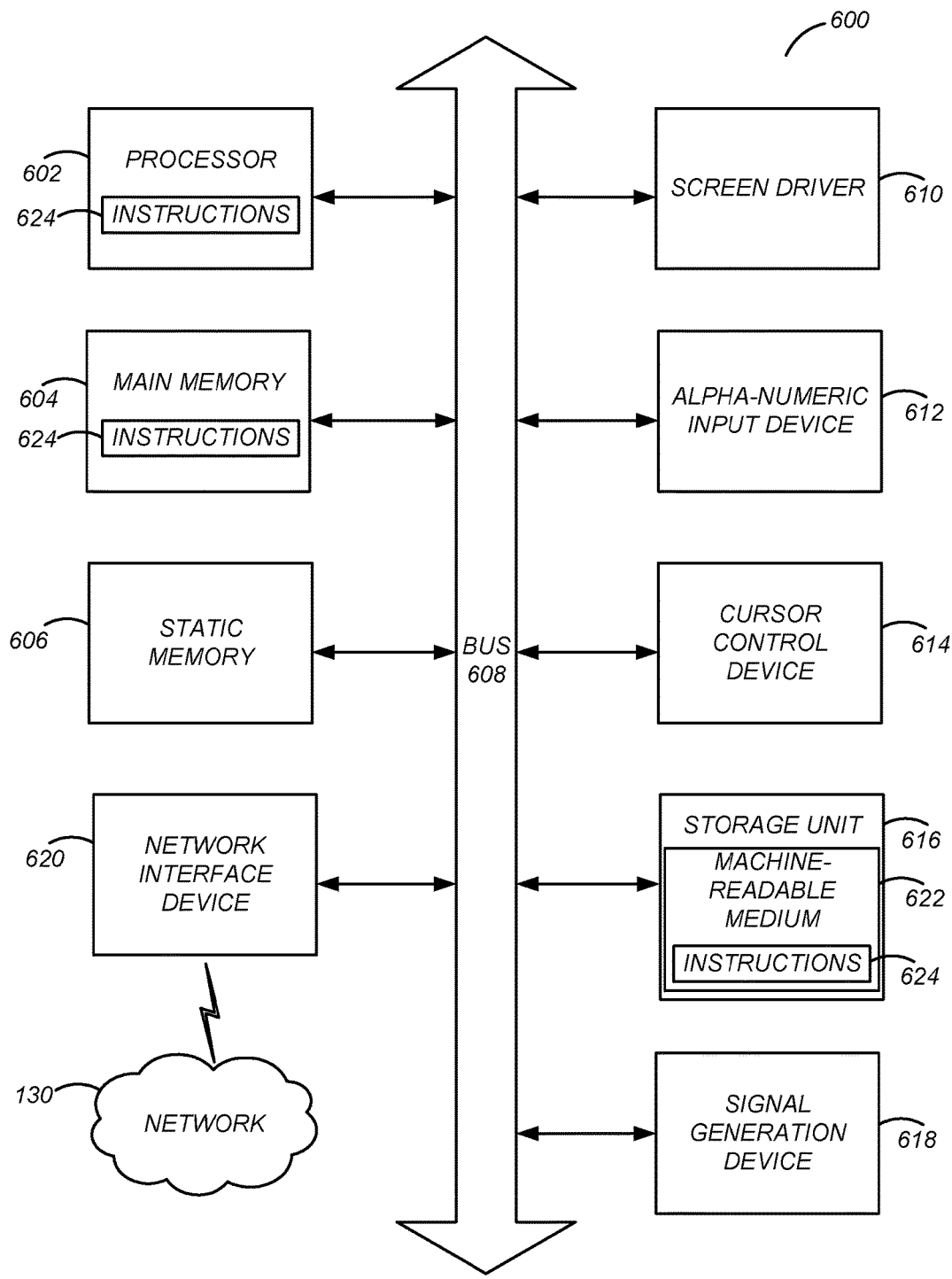
FIG. 6 is a block diagram illustrating components of an example machine able to read instructions from a machine-readable medium and execute them in one or more processors (or controllers) in accordance with one embodiment.

FIG. 6 is a block diagram illustrating components of an example machine able to read instructions from a machine-readable medium and execute them in one or more processors (or controllers) in accordance with one example embodiment. The instructions may correspond to the processes, for example, described in FIGS. 5A-B. The instructions also may correspond to the components/modules carrying out the functionality disclosed in FIGS. 1-4D.

Specifically, FIG. 6 shows a diagrammatic representation of an example form of a computer system 600. The computer system 600 can be used to execute instructions 624 (e.g., program code or software) for causing the machine to perform any one or more of the methodologies (or processes) described herein, for example, in FIGS. 1-5B. The machine may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein. In addition, it is noted that not all the components noted in FIG. 6 may be necessary for a machine to be configured to execute the systems and/or processes described within the disclosure.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed configuration provides benefits and advantages that include, for example, indexing data entries in database using keys that indicate relative attributes between the data entries. Additional benefits and advantages may include reducing the computational time or resources required to process queries or read information from the database. Moreover, the key database and key space database enables users to query data entries using a target relative attribute, e.g., relative time between events. Thus, in example use cases, these advantages may enable more rapid drug development, treatments, or medical research while maintaining updated and indexed databases of data entries at large scale.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-2. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 200 or processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for indexing data entries that may be executed through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for indexing of data entries in an indexing system, the method comprising:
   determining automatically that a first timestamp of a first data entry is between a second timestamp of a second data entry and a third timestamp of a third data entry, the second and third data entries indexed in a database, the first data entry, the second data entry, and the third data entry describing a first event, a second event, and a third event, respectively;
   generating a first vector corresponding to a first temporal distance between the first data entry and the second data entry using the first timestamp and the second timestamp;
   generating a second vector corresponding a second temporal distance between the first data entry and the third data entry using the first timestamp and the third timestamp;
   updating the database to index the first data entry using the first vector and the second vector by:
      generating a first key using the first vector to map the first data entry to the second data entry,
      generating a second key using the second vector to map the first data entry to the third data entry, and
      storing the first key and the second key in a key database;
   receiving, by the indexing system from a client device, a query of the database, the query indicating at least a target temporal distance and a target type of event, wherein the target type of event is a medical symptom, a medical diagnosis, a medical treatment, or a medical procedure;
   determining a response to the query by:
      determining that the target type of event corresponds to a type of the first event;
      comparing the target temporal distance with at least one of the first temporal distance and the second temporal distance by determining that the at least one of the first temporal distance and the second temporal distance is less than or equal to the target temporal distance,
      retrieving, by the indexing system from the key database, at least one of the first key and the second key based on the comparison, and
      retrieving, by the indexing system from the database, information associated with at least one of the data entries using the at least one of the first key and the second key retrieved from the key database; and
   transmitting the response from the indexing system to the client device.

2. The method of claim 1, wherein the target temporal distance indicates a duration of time, the query further indicating one or more criteria, the method further comprising:
   determining, responsive to the comparison of the target temporal distance with the at least one of the first temporal distance and the second temporal distance, that at least one of the second event and the third event occurred within the duration of time from the first event;
   determining that the at least one of the second event and the third event satisfies the one or more criteria; and
   transmitting, for the response, information describing the at least one of the second event and the third event.

3. The method of claim 1, wherein the query further indicates a first subject identifier, and wherein determining the response to the query further comprises:
   determining a second subject identifier associated with the first event; and
   determining that the first subject identifier matches the second subject identifier.

4. The method of claim 1, wherein the first temporal distance represents forward chronological time and the second temporal distance represents backward chronological time.

5. The method of claim 1, further comprising:
   determining a subject identifier associated with the first event, the second event, and the third event; and
   updating a key space database to include a mapping of the subject identifier to each of the first event, the second event, and the third event.

6. The method of claim 5, further comprising:
   determining another response to another query of the database by retrieving the mapping from the key space database using the subject identifier.

7. The method of claim 5, wherein the mapping includes the first timestamp, the second timestamp, and the third timestamp in a data structure having a JavaScript Object Notation (JSON) format.

8. A computer-implemented method for indexing of data entries in an indexing system, the method comprising:
   determining a target index of a first data entry;
   retrieving, from a key space database, a set of data entries each associated with the target index, wherein the key space database includes, for each of a plurality of entities, a data structure indicating all events stored in a database associated with the corresponding entity, the target index indicating an entity of the plurality of entities;
   for at least one pair of data entries of the set of data entries, each of the pairs including a second data entry and third data entry, the second and third data entries indexed in the database, the first data entry, the second data entry, and the third data entry describing a first event, a second event, and a third event, respectively;
   determining that a first timestamp of the first data entry is between a second timestamp of the second data entry and a third timestamp of the third data entry;
   generating a first key using a first temporal distance between the first data entry and the second data entry determined using the first timestamp and the second timestamp, the first key mapping the first data entry to the second data entry;
   generating a second key using a second temporal distance between the first data entry and the third data entry determined using the first timestamp and the third timestamp, the second key mapping the first data entry to the third data entry;
   updating a key database to store the first key and the second key;

updating the key space database to index the first data entry with the set of data entries;

receiving, by the indexing system from a client device, a query of the database, the query indicating at least a target temporal distance;

determining a response to the query by:
comparing the target temporal distance with at least one of the first temporal distance and the second temporal distance;
retrieving, by the indexing system from the key database, at least one of the first key and the second key based on the comparison; and
retrieving, by the indexing system from the database, information associated with at least one of the data entries using the at least one of the first key and the second key retrieved from the key database; and transmitting the response from the indexing system to the client device.

9. The method of claim 8, wherein the query further indicates a first subject identifier associated with the first event, and wherein determining the response to the query further comprises:
determining a second subject identifier associated with the first event; and
determining that the first subject identifier matches the second subject identifier.

10. The method of claim 8, wherein the first temporal distance represents forward chronological time and the second temporal distance represents backward chronological time.

11. The method of claim 8, further comprising:
determining a subject identifier associated with the first event, the second event, and the third event; and
updating the key space database to include a mapping of the subject identifier to each of the first event, the second event, and the third event.

12. The method of claim 11, further comprising:
determining another response to another query of the database by retrieving the mapping from the key space database using the subject identifier.

13. The method of claim 11, wherein the mapping includes the first timestamp, the second timestamp, and the third timestamp in JavaScript Object Notation (JSON) format.

14. A non-transitory computer-readable storage medium comprising stored instructions for indexing of data entries in an indexing system, the instructions when executed by a processor causes the processor to:
determine that a first timestamp of a first data entry is between a second timestamp of a second data entry and a third timestamp of a third data entry, the second and third data entries indexed in a database, the first data entry, the second data entry, and the third data entry describing a first event, a second event, and a third event, respectively;
determine a first temporal distance between the first data entry and the second data entry using the first timestamp and the second timestamp;
determine a second temporal distance between the first data entry and the third data entry using the first timestamp and the third timestamp;
update the database to index the first data entry using the first temporal distance and the second temporal distance by:
generate a first key using the first vector to map the first data entry to the second data entry,
generate a second key using the second vector to map the first data entry to the third data entry, and
store the first key and the second key in a key database;
receive, by the indexing system from a client device, a query of the database, the query indicating at least a target temporal distance and a target type of event, wherein the target type of event is a medical symptom, a medical diagnosis, a medical treatment, or a medical procedure;
determine a response to the query by:
determine that the target type of event corresponds to a type of the first event;
compare the target temporal distance with at least one of the first temporal distance and the second temporal distance by determining that the at least one of the first temporal distance and the second temporal distance is less than or equal to the target temporal distance,
retrieve, by the indexing system from the key database, at least one of the first key and the second key based on the comparison, and
retrieve, by the indexing system from the database, information associated with at least one of the data entries using the at least one of the first key and the second key retrieved from the key database; and
transmit the response from the indexing system to the client device.

15. The non-transitory computer-readable storage medium of claim 14, wherein the target temporal distance indicates a duration of time, the query further indicating one or more criteria, the storage medium having further instructions that when executed by the processor causes the processor to:
determine, responsive to the comparison of the target temporal distance with the at least one of the first temporal distance and the second temporal distance, that at least one of the second event and the third event occurred within the duration of time from the first event;
determine that the at least one of the second event and the third event satisfies the one or more criteria; and
transmit, for the response, information describing the at least one of the second event and the third event.

16. The non-transitory computer-readable storage medium of claim 14, wherein the query further indicates a first subject identifier, and wherein determine the response to the query further comprises:
determine a second subject identifier associated with the first event; and
determine that the first subject identifier matches the second subject identifier.

17. The non-transitory computer-readable storage medium of claim 14, wherein the first temporal distance represents forward chronological time and the second temporal distance represents backward chronological time.

18. The non-transitory computer-readable storage medium of claim 14, having further instructions that when executed by the processor causes the processor to:
determine a subject identifier associated with the first event, the second event, and the third event; and
update a key space database to include a mapping of the subject identifier to each of the first event, the second event, and the third event.

19. The non-transitory computer-readable storage medium of claim 18, having further instructions that when executed by the processor causes the processor to:

determine another response to another query of the database by retrieving the mapping from the key space database using the subject identifier.

20. The non-transitory computer-readable storage medium of claim 18, wherein the mapping includes the first timestamp, the second timestamp, and the third timestamp in a data structure having a JavaScript Object Notation (JSON) format.

* * * * *